(12) United States Patent
Van Camp et al.

(10) Patent No.: US 6,668,675 B2
(45) Date of Patent: Dec. 30, 2003

(54) SHIFT LINKAGE CONTROL ASSEMBLY APPARATUS

(75) Inventors: Michael A. Van Camp, Swartz Creek, MI (US); Steven Alan Kornburger, Oxford, MI (US); Anthony P Tata, Linden, MI (US)

(73) Assignee: General Motors Corporation, Detroit, MI (US)

( * ) Notice: Subject to any disclaimer, the term of this patent is extended or adjusted under 35 U.S.C. 154(b) by 56 days.

(21) Appl. No.: 10/123,729

(22) Filed: Apr. 16, 2002

(65) Prior Publication Data

US 2003/0192389 A1 Oct. 16, 2003

(51) Int. Cl.[7] .............................. B60K 20/00; G05G 9/00
(52) U.S. Cl. ........................ 74/473.1; 24/545; 403/258
(58) Field of Search ....................... 74/473.1; 24/545, 24/563; 403/241, 244, 264, 262, 258

(56) References Cited

U.S. PATENT DOCUMENTS

| | | | | | |
|---|---|---|---|---|---|
| 4,050,831 A | * | 9/1977 | DuBois | ....................... | 403/243 |
| 4,325,266 A | * | 4/1982 | Lynch | ......................... | 74/482 |
| 4,627,304 A | * | 12/1986 | Dougherty et al. | ........... | 74/469 |
| 5,178,479 A | * | 1/1993 | Brown et al. | .................. | 403/13 |
| 5,709,498 A | * | 1/1998 | Sova et al. | .................. | 403/196 |
| 6,327,160 B1 | * | 12/2001 | Liao | ........................... | 361/809 |
| 2003/0051319 A1 | * | 3/2003 | Herron | ......................... | 24/563 |

\* cited by examiner

*Primary Examiner*—David Fenstermacher
(74) *Attorney, Agent, or Firm*—Laura C. Hargitt

(57) ABSTRACT

A shift control assembly and method includes a shift linkage, a shift control rod, and a retainer member. The retainer member is secured to the shift control linkage in a manner such that a fastener integral with the linkage extends through a portion of the retainer clip. The shift control rod is secured to the retainer by clip portions formed thereon in a manner such that a final assembly threaded member can be secured on the fastener member of the shift linkage to complete the shift control assembly. The assembly method involves providing a shift link with a fastener secured thereto, assembling a retainer on the shift link, assembling a control rod on the retainer, and securing the assembly together with a fastener member securely engaging the fastener secured to the shift link.

4 Claims, 3 Drawing Sheets

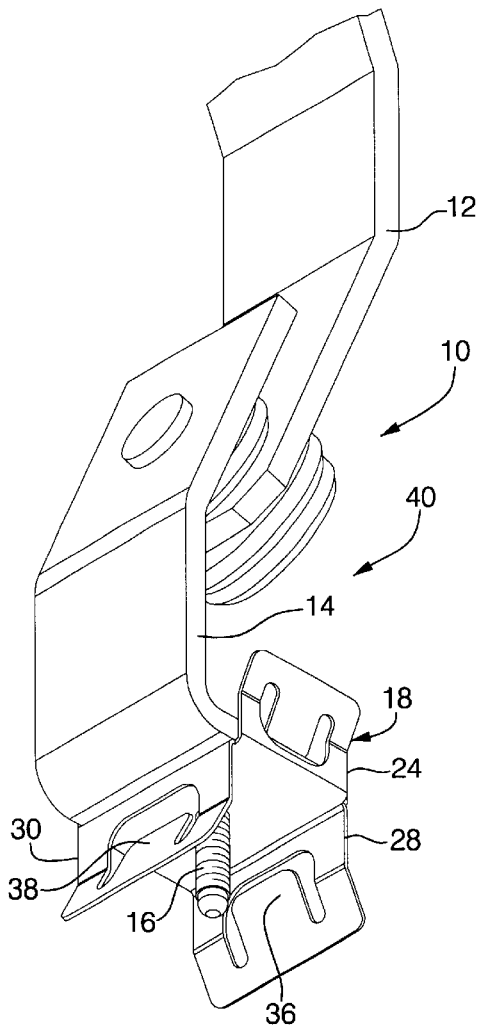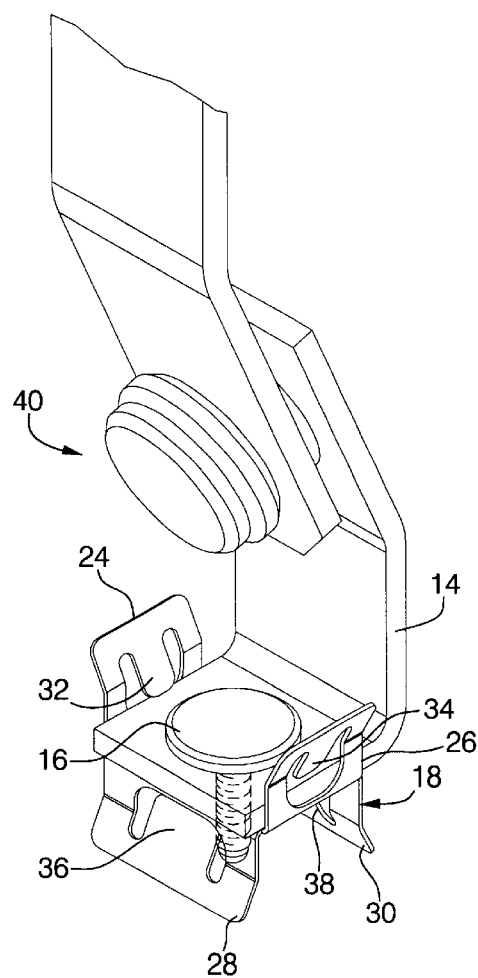
FIG. 1
FIG. 2

SHIFT LINKAGE CONTROL ASSEMBLY APPARATUS

TECHNICAL FIELD

This invention relates to shift linkage controls and, more particularly, to the interconnection between the manual shift linkage and the transmission control rod.

BACKGROUND OF THE INVENTION

Power transmissions for automotive vehicles include a linkage connection between the interior of the automobile and the transmission, which is assembled beneath the vehicle. The linkage connection between these two members includes a shift lever member, connected with a manual shift control within the operator's compartment, and a control rod, which is connected with the transmission, to manipulate the operating condition of the transmission.

During assembly of the vehicle, the shift lever member is depending from the compartment and the control rod is loosely hanging under the vehicle. It is necessary for the operator to assemble the control rod onto the linkage and secure the control rod and linkage in position with a fastener. This is accomplished in an overhead operation and the operator is required to use two hands to manipulate the linkage and control rod, and then maintain the control rod in position while the fastener is connected with the linkage.

This is rather tedious work and time consuming from a labor operations standpoint. Moreover, it is a difficult overhead operation for the assembler in that it requires two hands, and in many applications, a special tool to assemble the threaded fasteners together to complete the assembly.

SUMMARY OF THE INVENTION

It is an object of the present invention to provide an improved shift control linkage assembly and retainer apparatus and a method of assembly.

In one aspect of the present invention, plant assembly time and operator stress is reduced.

In another aspect of the present invention, the quality of the assembly is improved.

In yet another aspect of the present invention, the operator is not required to physically maintain the rod in alignment with the shift linkage fastener while the final assembly fastener is being connected thereto.

In still another aspect of the present invention, the shift linkage and a fastener secured thereto is attached to a crimp member prior to assembly in the vehicle.

In yet still another aspect of the present invention, a slotted control rod member is secured to the crimp member with the fastener portion of the linkage extending through the slot portion.

In a yet still another aspect of the present invention, a second threaded fastener component is secured to the first threaded fastener component to complete the linkage assembly.

DESCRIPTION OF THE DRAWINGS

FIG. 1 is an isometric view of a portion of a transmission shift linkage with a retainer clip installed thereon.

FIG. 2 is another isometric view of the shift linkage and retainer clip.

DESCRIPTION OF THE EXEMPLARY EMBODIMENT

Figure 3:
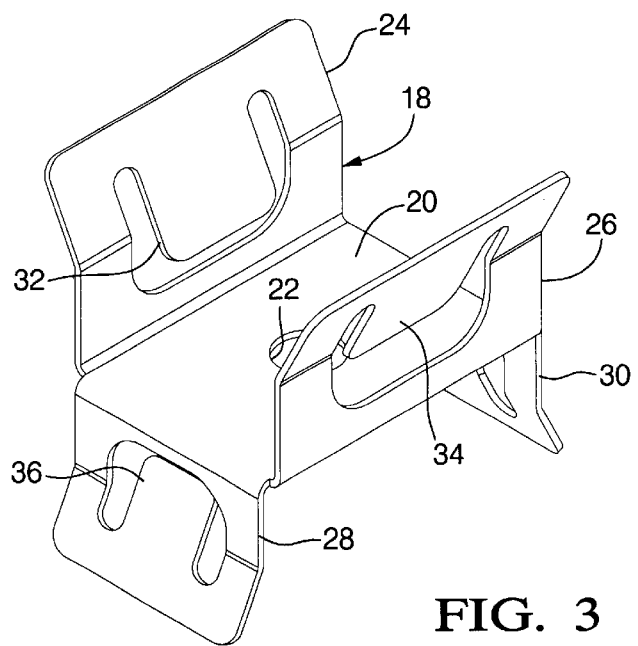
FIG. 3 is an isometric view of the retainer clip shown in FIGS. 1 and 2.

Referring to the drawings, wherein like characters represent the same or corresponding parts throughout the several views, there is seen in FIG. 1 a shift linkage 10 having a first link member 12 and a second link member 14. The second link 14, as seen in FIG. 2, has a fastener 16 secured thereto. The fastener 16 extends downwardly, as seen in FIG. 1, through the link 14. The link 14 has a clip member or retainer 18 mounted thereon. The clip member 18, as seen in FIG. 3, includes a body 20 having a substantially central aperture 22 through which the fastener 16 extends.

The retainer 18 also includes two upstanding wall members 24 and 26 extending from the body 20 and two downwardly depending wall members 28 and 30 extending from the body 20. The wall members 24 and 26, as seen, are on opposed sides of the body 20 as are the wall members 28 and 30. The wall member 24 has a tab or clip portion 32 formed therein, which extends inwardly from the wall 24 toward the aperture 22. The wall 26 has a tab or clip portion 34, which extends inwardly therefrom toward the aperture 22. The tabs 32, 34 clip to the link 14 to secure the retainer 18 thereon. The walls 28 and 30 have respective tabs or clip portions 36 and 38 which extend inwardly toward the aperture 22.

An assembly 40 comprised of the shift links 12 and 14, the fastener 16 and the retainer 18 can be completed prior to assembly within the vehicle. During assembly within the vehicle, the assembly 40 extends downwardly through a body portion of the vehicle, not shown, to an area immediately under the vehicle body. This assembly 40 is placed in close proximity with the transmission of the vehicle, not shown. The transmission is a conventional multi-ratio transmission that is controlled by the operator through a shift lever, not shown, within the vehicle passenger compartment. The shift lever is connected with the link 12 in a conventional manner.

Figure 4:
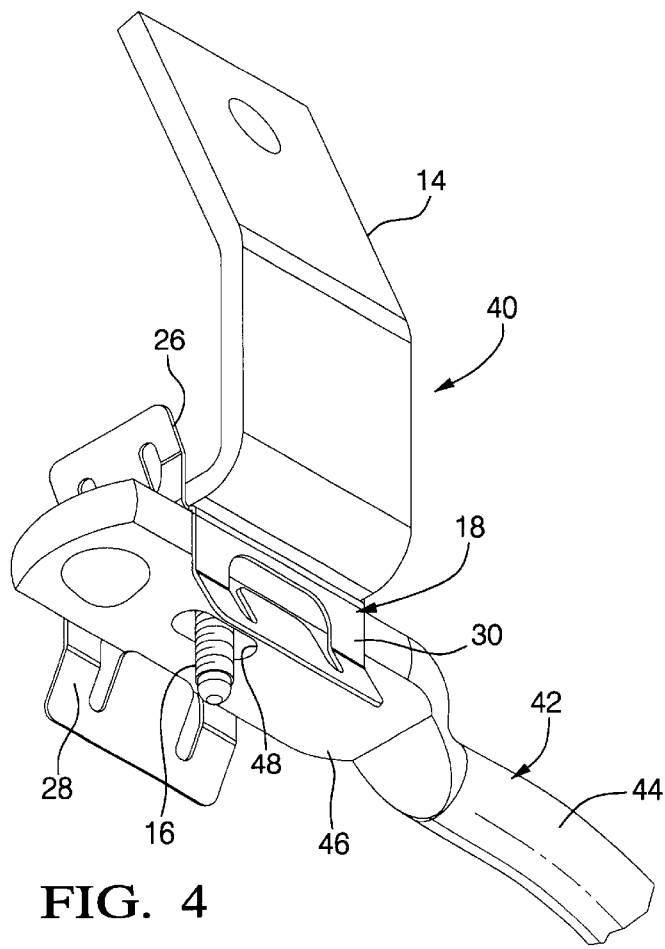
FIG. 4 is an isometric view of the control rod and shift lever being secured together by the clip member.

As seen in FIG. 4, a control rod 42 extends under the vehicle body and has one end 44 operatively connectable with the vehicle transmission. The connection with the transmission is a conventional connection well known in the art and is therefore not shown in the present application. The control rod 42 has a flat portion 46 with a slot 48 formed therein. The control rod 42 is secured to the retainer 18 and held in position by the tabs 36 and 38 with the fastener 16 extending downwardly through the slot 48. The slot 48 is of sufficient length to accommodate the assembly tolerances that are present when the vehicle is assembled. This procedure of joining the control rod 42 to the assembly 40 can be accomplished by an operator in a single-handed operation. The operator merely grips the control rod 42 and, with slight pressure, inserts the flat portion 46 into the retainer 18 such that the tabs 36 and 38 contact the underside flat portion 46 of the rod 42. The rod 42 will be retained in position by the clip 18 for the final assembly by a nut or other type of threaded fastener 50.

Figure 5:
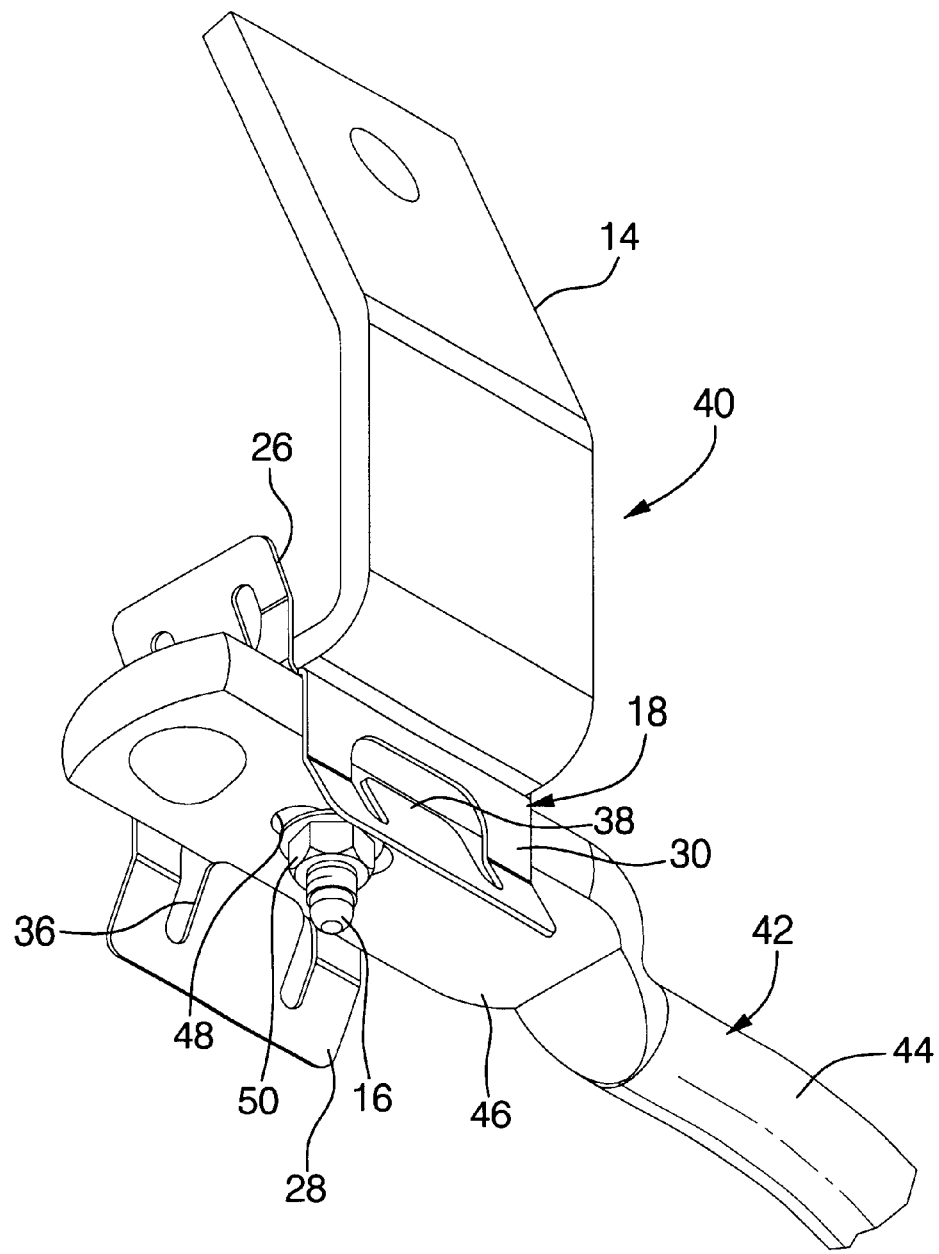
FIG. 5 is an isometric view of the shift control assembly and retainer apparatus after final assembly.

As seen in FIG. 5, after the rod 42 has been assembled to the retainer 18, the threaded fastener 50 is secured on the fastener 16 to complete the shift linkage assembly. The fastener 50 can be installed on the retainer 18 with a conventional tool, such as a nut runner. It is not necessary to hold the fastener 16 stationary since it is secured to the linkage assembly 40 and cannot rotate relative thereto. The fastener 50 is preferably a self-locking type fastener, which when secured to the proper torque will be retained on the fastener 16.

Upon reviewing the drawings and the above description, it should now be evident to those skilled in the art that the assembly 40 is accomplished quite simply by snapping the retainer 18 onto the link 14 prior to or even after assembly within the vehicle. The control rod 42 is connected to the assembly 40 in a simple one-handed procedure and is properly aligned thereon and held in position by the clip 18 thereby eliminating the tedium of manually retaining these components in position. Following this procedure, the fastener 50 is then installed in a single-handed operation with a conventional tool mechanism, such that the assembly is completed in a minimum amount of time with a minimum amount of stress being imposed on the operator thereby improving the overall assembly efficiency and reducing the operator fatigue for this repetitive operation.

What is claimed is:

1. A shift control assembly and retainer apparatus comprising:

a shift linkage having a fastener means secured thereto;

a control rod having a slot formed therein adapted to accept said fastener means;

a retainer having a portion thereof surrounding said fastener means, a first clip means for securing said retainer to said shift linkage, and a second clip means for securing said control rod to said retainer prior to final assembly; and means for engaging said fastener means to secure said control rod to said shift linkage.

2. The shift control assembly and retainer apparatus defined in claim 1 further comprising:

said retainer having a body portion, said first clip means including first and second walls extending from opposed sides of said body portion in a first direction, and said second clip means having third and fourth walls extending from opposed sides of said body portion in a second direction opposite said first direction.

3. The shift control assembly and retainer apparatus defined in claim 2 further comprising:

said body portion having a substantially central aperture formed therein surrounding a portion of said fastener;

said first and second walls each having a tab portion extending inwardly therefrom toward said aperture and engaging a surface on said shift linkage to secure said retainer on said shift linkage; and said third and fourth walls each having a tab portion extending inwardly therefrom toward said aperture and engaging a surface on said control rod to hold said control rod on said retainer.

4. A method of assembling a shift control mechanism comprising the steps of:

a. providing a shift linkage with a first fastener secured thereto;

b. clipping a retainer to said shift linkage in a position surrounding said first fastener and presenting at least two tab members extending therefrom;

c. assembling a control rod onto said retainer with a slot portion surrounding a portion of said first fastener and said tab members retaining said control rod on said shift linkage; and d. securing a second fastener to said first fastener to hold the control rod and shift linkage together.

* * * * *